United States Patent [19]

Sakamoto et al.

[11] Patent Number: 5,358,731
[45] Date of Patent: Oct. 25, 1994

[54] PROCESS FOR PRODUCING KONJAK MANNAN CONTAINING PROCESSED MINCED MEAT FOODS

[75] Inventors: Jiro Sakamoto; Itsuo Iga, both of Kawasaki, Japan

[73] Assignee: Ajinomoto Co., Inc., Tokyo, Japan

[21] Appl. No.: 160,288

[22] Filed: Dec. 2, 1993

Related U.S. Application Data

[63] Continuation of Ser. No. 975,123, Nov. 12, 1992, abandoned, which is a continuation of Ser. No. 865,659, Apr. 7, 1992, abandoned, which is a continuation of Ser. No. 742,188, Aug. 2, 1991, abandoned, which is a continuation of Ser. No. 434,577, Nov. 13, 1989, abandoned, which is a continuation-in-part of Ser. No. 260,609, Oct. 21, 1988, abandoned.

[30] Foreign Application Priority Data

Dec. 9, 1987 [JP] Japan ................... 62-311417

[51] Int. Cl.$^5$ .................. A23L 1/314; A23L 1/317
[52] U.S. Cl. ..................... 426/574; 426/646
[58] Field of Search .......... 426/573, 574, 575, 576, 426/577, 578, 646, 652

[56] References Cited

U.S. PATENT DOCUMENTS

| | | | |
|---|---|---|---|
| 4,362,752 | 12/1982 | Sugino et al. | 426/643 X |
| 4,427,704 | 1/1984 | Cheney et al. | 426/574 X |
| 4,615,901 | 10/1986 | Yoshioka et al. | 426/574 X |
| 4,676,976 | 6/1987 | Toba et al. | 426/573 X |
| 4,876,103 | 10/1989 | Kawano et al. | 426/646 X |

FOREIGN PATENT DOCUMENTS

| | | | |
|---|---|---|---|
| 47-43260 | 12/1972 | Japan | 426/574 |
| 52-47948 | 4/1977 | Japan | 426/574 |
| 58-63363 | 4/1983 | Japan | 426/574 |
| 58-63364 | 4/1983 | Japan | 426/574 |
| 59-146560 | 8/1984 | Japan | 426/574 |

OTHER PUBLICATIONS

Derwent, No. 88-273869[39], Derwent Publications Ltd, London, GB; & JP-A-63 198 951 (Ajinomoto K.K) 17, Aug. 1988 *Abstrat*.

Patent Abstracts of Japan, vol. 10, No. 377 (C-392 [2434], 16th Dec. 1986; & JP-A-61 170 362 (Osamu Uchi) Jan. 8, 1986 *Abstract*.

*Primary Examiner*—Arthur L. Corbin
*Attorney, Agent, or Firm*—Oblon, Spivak, McClelland, Maier & Neustadt

[57] ABSTRACT

A process for producing processed minced meat foods comprising adding from 0.01 to 0.04 parts by weight of an alkaline substance to an aqueous sol containing at least 1 part by weight of konjak mannan, 0.2 to 10 parts by weight of other gel-forming materials and 15 to 50 parts by weight of water, mixing the resulting swollen gel with minced meat and, optionally other food ingredients, and then freezing the resulting mixture.

10 Claims, No Drawings

PROCESS FOR PRODUCING KONJAK MANNAN CONTAINING PROCESSED MINCED MEAT FOODS

This application is a continuation of application Ser. No. 07/975,123, filed Nov. 12, 1992, non abandoned, which is a continuation of Ser. No. 07/865,659, filed on Apr. 7, 1992, which is a continuation of Ser. No. 07/742,188, filed Aug. 2, 1991, which is a continuation of Ser. No. 07/434,577, filed Nov. 13, 1989, which is a continuation-in-part of 07/260,609, filed Oct. 21, 1988, which are all abandoned.

BACKGROUND OF THE INVENTION

1. Field of the Invention

The present invention relates to a novel process for producing processed minced meat foods. More particularly, it relates to a process for producing processed minced meat products such as hamburgers, and the like whose characteristic heterogeneous feel does not suffer deterioration over time, and which also do not suffer shape deformation and reduction in volume because of heat shrinkage.

2. Description of the Background

One major characteristic of the feel upon the eating of processed meat products consisting mainly of minced meat such as hamburger lies in the heterogeneous feel or so-called "feeling of meat grains". In general, such minced meat products are typical of high caloric foods since meat is used therein as a main raw material. Upon cooking, they tend to shrink because of so-called "roast-shrinkage" which results in deformation of the meat shape, reduction in volume of the meat, and the like.

One method for reducing the caloric value of processed minced meat foods is to replace a portion of the minced meat with a low caloric foodstuff such as konjak jelly. Konjak jelly is a traditional food prepared from swollen konjak mannan, a component present in devil's-tongue, by the addition of an alkaline substance, such as lime milk, or the like to the konjak mannan followed by heat gelation. Upon eating it gives a characteristic feeling based on its high elasticity.

In known methods of producing processed meat foods, a hydrated product of konjak mannan is mixed with a foodstuff such as minced meat, or the like, and then is subjected to gelation before or after the mixing. However, when konjak mannan is mixed with processed minced meat foods in this manner, the feeling of the products upon eating is seriously impaired by the viscoelasticity characteristic of konjak, and the desirable heterogeneous texture based on the feeling of meat grains is very difficult to obtain.

Accordingly, when konjak mannan gel is used to reduce the caloric value of a meat product or to alleviate "roast shrinkage," it is difficult to obtain processed minced meat foods which exhibit the desired heterogeneous feeling upon eating. A need therefore continues to exist for minced meat products which exhibit a desired heterogenous feel upon eating.

SUMMARY OF THE INVENTION

Accordingly, one object of the present invention is to provide a minced meat product of improved heterogeneous feel and a lower caloric content.

Another object of the invention is to provide a minced meat product which further resists shape deformation and reduction in volume.

Briefly, these objects and other objects of the invention as hereinafter will become more readily apparent can be attained in a method of producing processed minced meat foods by adding from 0.01 to 0.04 parts by weight of an alkaline substance to an aqueous sol containing at least 1 part by weight of konjak mannan, 0.2 to 10 parts by weight of other gel-forming materials and 15 to 50 parts by weight of water, mixing the resulting swollen gel with minced meat and optionally other food ingredients, and then freezing the resulting mixture.

DETAILED DESCRIPTION OF THE PREFERRED EMBODIMENTS

It is known that when konjak jelly is frozen and thawed, its water-holding capability deteriorates significantly, and it changes into a spongy substance. Because of this, attempts have been made to use cyclodextrin and carrageenan in combination with konjak in order to impart a freeze-resistant property to konjak (see Japanese Patent Application (Laid Open) No. 216,662/83). In the present invention, it has been found that (1) a frozen gel of konjak mannan has an increased hardness and a smaller elasticity in comparison to a heated gel, (2) syneresis at the time of freezing and thawing can be suppressed by adding a gel-forming material other than konjak mannan such as, for example, starch, to swollen konjak mannan, and (3) an aqueous sol of konjak mannan has a sufficient bonding capability after the addition of an alkaline substance until the completion of its gelation.

In the present invention, konjak mannan is used in combination with other edible materials, which have the ability of forming gel, as raw materials for the aqueous sol. Konjak mannan which is used in the present invention includes both konjak powders and refined glucomannan. Any konjak powder which is capable of forming a gel by treatment with an alkaline substance can be used regardless of the degree of purification. Examples of other gel-forming materials usable in combination with konjak mannan include raw starches such as potato starch, cornstarch, wheat starch, rice starch, waxy starch, and the like; processed starches such as alpha-starches, aged starches, and the like; grain powders such as wheat powders, rice powders, starch powders, and the like; gums such as xanthan gum, locust bean gum, tamarind gum, and the like; polysaccharides such as carrageenan, alginic acid, pectin, agar-agar and the like; and proteins such as gelatin, soybean protein, egg white, and the like.

In the present invention at least one gel-forming material is selected from those described above. Gel-forming materials other than konjak mannan are used in an amount of 0.2 to 10 parts by weight, per 1 part by weight of konjak mannan. When gel-forming materials other than konjak mannan are used in an amount less than the lower limit of the above range, undesirably high syneresis will occur during freezing and thawing, and a cooked product having poor quality will result. When they are used in an amount greater than the upper limit stated, gelation of the konjak mannan upon freezing will be insufficient, and a cooked product will result which exhibits a poor feel in the mouth upon eating.

The konjak mannan and the other gel-forming material are swelled by water. It is however possible to swell konjak mannan alone. In this case, the other gel-forming material, which has not been swollen, can be added at a step after the swelling of konjak mannan. The swelling can be effected by water or an aqueous solution containing seasoning agents or the like. In either case, the amount of water used to swell the gel ranges from 15 to 50 times the weight of konjak mannan. If the amount of water used for the swelling is less than 15 times the weight of konjak mannan, the konjak mannan will swell, or will absorb water only insufficiently to form an inhomogeneous gel. A product will therefore result which exhibits a poor feeling upon eating. On the other hand, if the amount of water is more than 50 times the weight of konjak mannan, the strength of the gel formed will be insufficient, and a product having a poor hardness will result.

Although the time required for the swelling step depends on the concentration of konjak mannan in the aqueous sol, it normally ranges from 1 to 2 hours at 20° C. if the amount of water used for swelling is in the above range. The swelling can be effected by allowing the mixture to stand or by stirring it with a kneader or the like. There are no particular restrictions on the swelling temperature.

After the completion of the swelling, the swollen product is subjected to an alkaline treatment. Suitable alkaline substances which can be employed include slaked lime (calcium hydroxide), sodium carbonate, potassium carbonate, sodium hydrogen-carbonate, monosodium phosphate, disodium phosphate, and the like. A solution or suspension containing one or more of these alkaline substances is added to, and allowed to contact with, the swollen product. The alkaline substance is normally used in an amount of from 0.01 to 0.04 times the weight of konjak mannan, although it may vary depending on the kind of alkaline substance used. If the alkaline substance is used in an amount less than the stated lower limit, the gelation of konjak mannan will not proceed sufficiently, whereas if the amount exceeds the stated range, an undesirably strong alkaline odor will result. The alkaline agent and the gel can be brought into uniform contact by kneading or the like.

After the alkaline treatment, the swollen product is allowed to stand for a time sufficient to allow gel formation. Usually a time of at least one hour, preferably ranging from 2 to 24 hours is sufficient. Gel formation occurs at a temperature of about 30° C. or below. The gel obtained is then minced, and the minced gel is mixed with minced meat and, if desired, other raw materials such as vegetables, or the like by using a kneader, silent cutter, or the like. There is no particular limitation on the means used for mixing. The product can be formed into a desired shape by using, e.g., a meat chopper or the like before it is subject to mixing. Seasoning agents and other ingredients can be added to minced meat such as vegetables, or the like, prior to or after the mixing or at the time of mixing with the swollen product.

The thus prepared mixture, if desired, is shaped into any desired shape and then subjected to freezing. The freezing is carried out at a temperature not higher than −10° C., preferably not higher than −40° C., because of possible destruction of the meat tissue resulting from the growth of crystals of ice. The frozen product can be cooked in a conventional manner and served for eating.

The processing of the present invention can be applied to any food that utilizes minced meat as a raw material such as hamburger, hamburger patties, meat balls, coarse cut sausages, shishkebabs, shao-mais, dumplings, or the like. In particular, the present invention is highly useful for the production of such shaped minced meat foods which have a hamburger-like, coarse ground sausage-like or pate-like texture, which may suffer from roast shrinkage and which require an appropriate hardness and heterogeneous feeling based on minced meat.

The advantage of this invention is that a low caloric minced meat product can be obtained which is free from the elasticity characteristic of konjak jelly, which possesses both appropriate hardness and heterogeneity and which gives no foreign feeling compared with ordinary products. In addition, the products, because of the heat (roast) stability of the frozen konjak mannan gel, do not exhibit heat shrinkage, which is often observed when ordinary meat products are subjected to heating.

Having generally described this invention, a further understanding can be obtained by reference to certain specific examples which are provided herein for purposes of illustration only and are not intended to be limiting unless otherwise specified.

EXAMPLES

Example 1

Hamburger

In 1,600 ml of water were suspended. 80 g of konjak mannan and 120 g of starch ("Ginrei" manufactured by Ajinomoto Co., Inc.), and the suspension was allowed to stand at room temperature for 1 hour in order to swell the konjak mannan. To the swollen product was added 200 ml of aqueous 0.8% calcium hydroxide solution, and the mixture was well kneaded. To this were added 2 kg of minced lean beef, 800 g of minced onion, 250 g of whole eggs, 100 g of bread crums, 32 g of sodium chloride and 0.8 g of white pepper. The resulting mixture was thoroughly admixed, shaped into an oval shape and then frozen in a freezer at −40° C. The frozen product was cooked on a hot plate at 160° to 200° C.

The thus cooked hamburgers had a caloric value less than about 30% of ordinary hamburgers and showed no shrinkage at the time when heated. They also had an appropriate hardness and a favorable heterogeneity.

Example 2

Coarse Cut Sausage

A mixture of 20 g of konjak mannan, 15 g of starch ("Ginrei" manufactured by Ajinomoto Co., Inc.) and 5 g of powdered egg white was prepared, and the mixture was suspended in 400 ml of water. The suspension was allowed to stand at 5° C. for 2 hours in order to swell the konjak mannan. To the swollen product was added 40 ml of aqueous 0.9% sodium hydroxide solution, and the mixture was kneaded thoroughly. Thereafter, 400 g of minced pork, 30 g of gelatin, 8 g of sodium chloride, 2 g of sodium glutamate and 0.3 g of white pepper were added to the kneaded product and them mixed. The resulting mixture was stuffed in a 15 mm diameter casing tube and frozen in a freezer at −15° C. The frozen product was heated in boiled water for 20 minutes to give a coarse cut sausage. The thus obtained product had a caloric value of about one-half that of ordinary products and showed an appropriate hardness and a sufficient binding strength.

Example 3

A mixture of 24 g of Konjak mannan, 12 g of starch ("GINREI" manufactured by Ajinomoto Co., Inc.), 20 g of aged starch ("HIGHSOFT" manufactured by Ajinomoto Co., Inc.), and 3 g of caramel was suspended in 480 ml of water. The suspension was allowed to stand at 10° C. for one hour in order to swell the konjak mannan, thereby obtaining a swollen sol. To the swollen sol was added 60 ml of 0.8% calcium hydroxide solution and the combined materials were mixed. This mixture was allowed to stand overnight in a refrigerator and then minced, mixed with 420 g of beef, 394 g of pork, 3.6 g of salt, 2 g of spices and 9 g of beef extract. The mixture was then formed into an oval shape. Thereafter the product was frozen in a freezer at −40° C. The frozen product was cooked on a hot plate at 160° to 200° C.

The thus cooked hamburger had a caloric value less than about 30% of ordinary hamburger and showed no shrinkage at the time of heating. The hamburger also had an appropriate hardness, chewiness and gumminess and a favorable texture.

Comparative Example 1

Hamburger Without Konjak Mannan 826 g of beef, 394 g or pork, 580 g of pork taste, 3.6 g of salt and 2 g of spices were mixed, formed into an oval shape and then frozen.

Comparative Example 2

394 g of the swollen product obtained as described in Example 3 was mixed with 420 g of minced beef, 394 g of minced pork, 580 g of pork paste, 3.6 g of salt, 2 g of spices and 9 g of beef extract. To this mixture were added 0.48 g of calcium hydroxide and 59.6 g of water. The combined materials were mixed. This mixture was formed into an oval shape and then frozen in a freezer at −40° C. The frozen product was cooked on a hot plate at 160° to 200° C.

The thus cooked hamburger had an elastic texture and was a product of poor similarity to hamburger when eaten.

Table 1 below shows the hardness, chewiness and gumminess properties of the products of Example 3 and Comparative Examples 1 and 2 as measured in a Texturometer (see M. C. Bourne, 62 Food Technology, July 1978).

TABLE 1

| TEXTUROMETER PROFILE ANALYSIS | | | |
|---|---|---|---|
| Samples | Hardness | Chewiness | Gumminess |
| Example 3 | 4.0 | 674 | 32.1 |
| Comparative Example 1 | 4.8 | 845 | 33.6 |
| Comparative Example 2 | 1.8 | 169 | 6.8 |

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A process for preparing a konjak mannan containing processed minced meat which has a hamburger-like, or coarse cut sausage-like texture, consisting essentially of:
   i) mixing
      a) at least one part by weight of konjak mannan,
      b) 0.2 to 10 parts by weight of a gel forming material other than konjak mannan, and
      c) 15–50 parts by weight of water, thereby obtaining an aqueous sol;
   ii) mixing 0.01–0.04 parts by weight of an alkaline substance into said aqueous sol;
   iii) allowing the mixture obtained in ii) to form a swollen gel;
   iv) chopping the gel obtained in iii);
   v) mixing said chopped gel with a minced meat; and then
   vi) freezing said mixture of chopped gel and minced meat thereby improving said hamburger-like or coarse cut sausage-like texture.

2. The process of claim 1, wherein said other gel-forming material is a member selected from the group consisting of raw starch, grain powder, gum, polysaccharide, animal protein and plant protein.

3. The process of claim 2, wherein said raw starch is potato starch, corn starch, wheat starch, rice starch or waxy starch.

4. The process of claim 2, wherein said grain powder is wheat powder, rice powder or starch powder.

5. The process of claim 2, wherein said polysaccharide is carrageenan, alginic acid, pectin or agar-agar.

6. The process of claim 1, wherein the swollen gel is obtained in 1 to 2 hours at 20° C.

7. The process of claim 1, wherein said alkaline substance is slaked lime, sodium carbonate, potassium carbonate, sodium hydrogen carbonate, monosodium phosphate or disodium phosphate.

8. The process of claim 1, wherein the mixture of step (v) is frozen at a temperature not greater than −10° C.

9. The process of claim 8, wherein said temperature of freezing is not higher than −40° C.

10. The process of claim 1 containing 0.2 to 1.5 parts by weight of a gel forming material other than konjak mannan.

* * * * *